(12) United States Patent
Wright

(10) Patent No.: US 9,499,182 B2
(45) Date of Patent: Nov. 22, 2016

(54) COMPOSITE BRAKE CYLINDER FOR A RAIL VEHICLE

(71) Applicant: NEW YORK AIR BRAKE, LLC, Watertown, NY (US)

(72) Inventor: Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 14/603,835

(22) Filed: Jan. 23, 2015

(65) Prior Publication Data
US 2016/0214630 A1 Jul. 28, 2016

(51) Int. Cl.
| | | |
|---|---|---|
| B60T 11/10 | (2006.01) | |
| B61H 13/34 | (2006.01) | |
| B61H 13/20 | (2006.01) | |
| B60T 17/08 | (2006.01) | |
| F16D 121/02 | (2012.01) | |
| F16D 125/08 | (2012.01) | |

(52) U.S. Cl.
CPC ............. *B61H 13/34* (2013.01); *B60T 17/081* (2013.01); *B60T 17/088* (2013.01); *B61H 13/20* (2013.01); *F16D 2121/02* (2013.01); *F16D 2125/08* (2013.01)

(58) Field of Classification Search
CPC .... B60T 17/08; B60T 17/081; B60T 17/088; F04B 53/16; F04B 53/166; B61H 13/34; B61H 13/20; F16D 2121/02; F16D 2125/08
USPC ...... 188/153 R, 153 D, 170, 322.19; 912/80, 912/82, 130 A; 277/552, 928
See application file for complete search history.

(56) References Cited

U.S. PATENT DOCUMENTS

| | | | | |
|---|---|---|---|---|
| 1,939,845 | A | * 12/1933 | Farmer | ................... B60T 17/08 303/1 |
| 2,204,795 | A | 6/1940 | Farmer | |
| 3,943,831 | A | * 3/1976 | Coupland | ............. B60T 17/083 188/170 |
| 5,193,432 | A | 3/1993 | Smith | |
| 5,315,918 | A | 5/1994 | Pierce | |

(Continued)

FOREIGN PATENT DOCUMENTS

| | | |
|---|---|---|
| CN | 2542526 | 4/2003 |
| EP | 0575830 | 12/1993 |
| EP | 2666686 | 11/2013 |

OTHER PUBLICATIONS

International Search Report Form PCT/ISA/210, International Application No. PCT/US2015/012639, pp. 1-11, Dated Sep. 28, 2015.

*Primary Examiner* — Pamela Rodriguez
(74) *Attorney, Agent, or Firm* — Bond Schoeneck and King PLLC; David Nocilly

(57) ABSTRACT

A brake cylinder having a filament wound composite pressure cylinder and a composite plastic non-pressure head. The pressure cylinder and non-pressure head are secured together by a pair of mating flanges and a V-shaped band securely attached over the flanges. The band has a gap that is easily adjustable to position the gap at the lowest point and be in alignment with a series of radially extending grooves in the flange of the non-pressure head, thereby ensuring proper drainage. The non-pressure head may include an integrally formed opening with a bearing surface for a piston rod, a seat for a piston return spring, a scraper for a piston rod, and a series of internal ribs that provide for structural support and act as stop against a piston overtravel.

13 Claims, 12 Drawing Sheets

(56) References Cited

U.S. PATENT DOCUMENTS

| | | | |
|---|---|---|---|
| 5,353,688 A * | 10/1994 | Pierce | B60T 17/085 188/170 |
| 6,378,414 B1 * | 4/2002 | Constantinides | B60T 17/085 92/63 |
| 6,904,698 B2 | 6/2005 | Halliar et al. | |
| 7,303,053 B2 | 12/2007 | McCurdy, Jr. | |
| 7,306,078 B2 | 12/2007 | Fish | |
| 8,256,341 B2 | 9/2012 | Rhoads | |
| 2014/0353095 A1 * | 12/2014 | Huber, Jr. | B61H 15/0028 188/199 |

* cited by examiner

COMPOSITE BRAKE CYLINDER FOR A RAIL VEHICLE

BACKGROUND OF THE INVENTION

1. Field of the Invention

The present invention relates to railway brake cylinders and, more specifically, to an improved brake cylinder assembly.

2. Description of the Related Art

Railway brake cylinders are traditionally made of cast iron, with multiple components in the assembly. The resulting assembly is heavy, prone to rust, and requires multiple models so that the particular installation will result in a brake cylinder having the non-pressure vent oriented at the bottom for proper drainage of accumulated water from condensation. Accordingly, there is a need for a brake cylinder that can have a drain that is properly oriented regardless of how the brake cylinder is positioned when it is installed.

BRIEF SUMMARY OF THE INVENTION

The present invention comprises a brake cylinder including a pressure cylinder with one end having an opening of a predetermined diameter and a first flange extending outwardly from the opening. The pressure cylinder is preferably made from filament wound composite. A non-pressure head having a corresponding opening with a second flange is positioned so that the second flange is in abutment to the first flange of the pressure cylinder. The non-pressure head is preferably made from a composite plastic. The second flange of the non-pressure head includes a plurality of radial grooves formed therein that extend from the interior to the exterior of the non-pressure head to allow for communication between the interior of the non-pressure head and the outside. A V-shaped band extends securely around the first and second flanges and has first and second ends that define a gap that may be easily positioned in alignment with at least one of the plurality of radial grooves in the second flange of the non-pressure head so that the brake cylinder can always drain downward regardless of orientation upon installation The non-pressure head is conical and may include an integrally formed opening at its apex with a bearing surface for supporting a piston rod that extends from the brake cylinder, a seat for a piston return spring, a scraper for the piston rod, and a series of internal ribs that provide for structural support and act as a stop against piston overtravel. The piston is positioned in the pressure cylinder and the hollow rod is coupled to the piston at one end. The hollow rod extends from the piston through the opening of the non-pressure head to be in contact with and properly positioned by the bearing surface and to engage the scraper. A piston return spring engages the piston of the pressure cylinder and the seat of the non-pressure head to bias the piston into a brakes released position. A series of mounting feet may be attached to the pressure cylinder, either by epoxy coated filaments or by straps, to mount the brake cylinder in place on the braking system of a rail vehicle.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
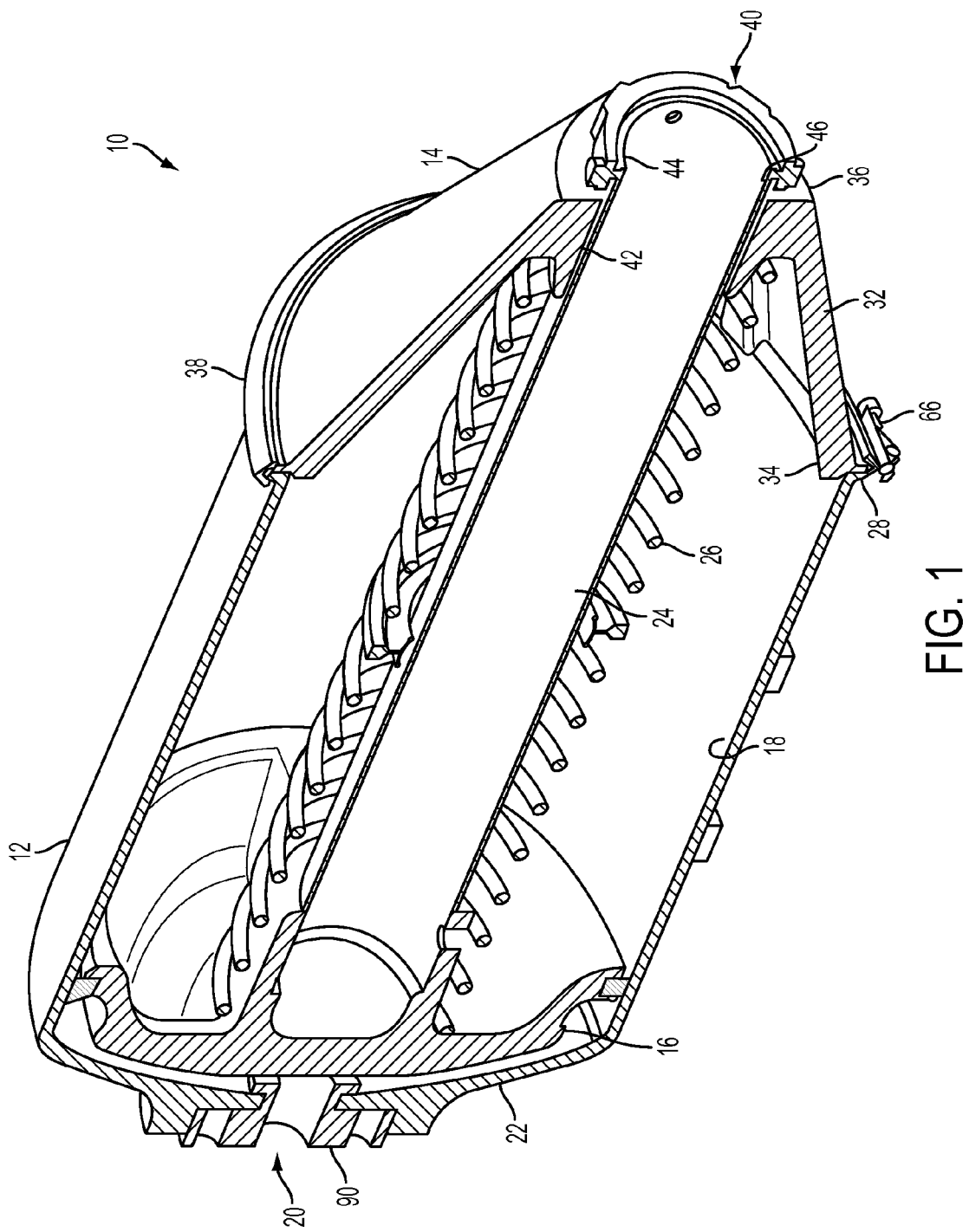
FIG. 1 is a cross-sectional view of a brake cylinder according to the present invention.

Referring now to the drawings, wherein like reference numerals refer to like parts throughout, there is seen in FIG. 1 a brake cylinder 10 having a pressure cylinder 12 coupled to a non-pressure head 14. Pressure cylinder 12 is generally cylindrical and houses a piston 16 that is movable within the cylindrical portion 18 of pressure cylinder 12 from a brakes released position to a brakes applied position in response to the introduction of pressurized air from a brake cylinder pressure source into an inlet 20 formed through a pressure dome 22 at one end of pressure cylinder 12. A hollow rod 24 is coupled to the piston to extend and retract from brake cylinder 10 as piston 16 moves between the brakes released and brakes applied positions. As in known in the art, hollow rod 24 is coupled to the brakes of a rail vehicle and thus will apply or release the brakes in response to movement of piston 16. A brake piston return spring 26 is positioned in brake cylinder 10 to bias piston 16 into the brakes released position in the absence of sufficient brake cylinder pressure at inlet 20. Pressure cylinder 12 includes a radially extending flange 28 at the opposing end from pressure dome 22 for coupling to non-pressure head 14.

Figure 2:
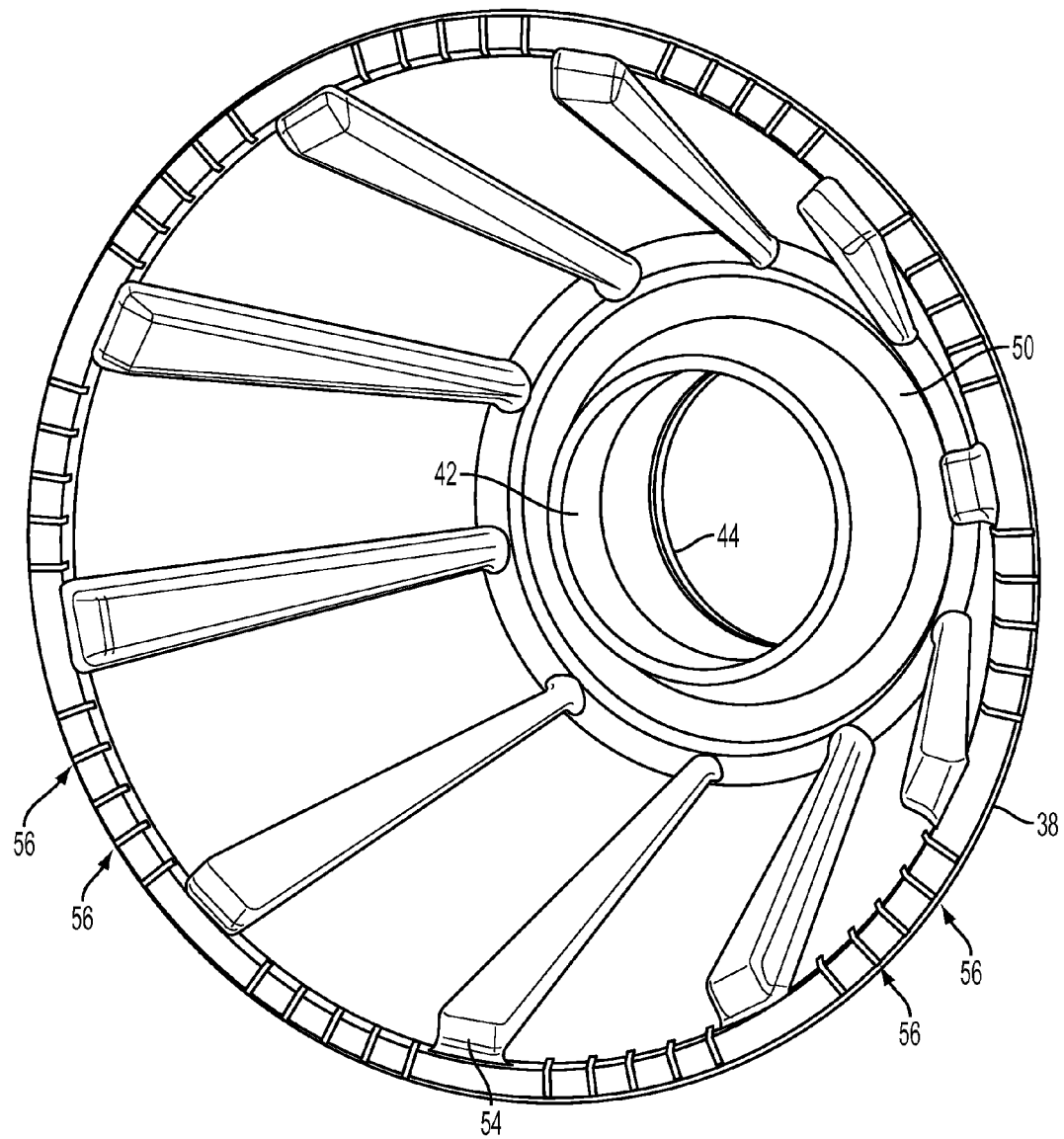
FIG. 2 is a perspective view of a non-pressure head for a brake cylinder according to the present invention.
Figure 3:
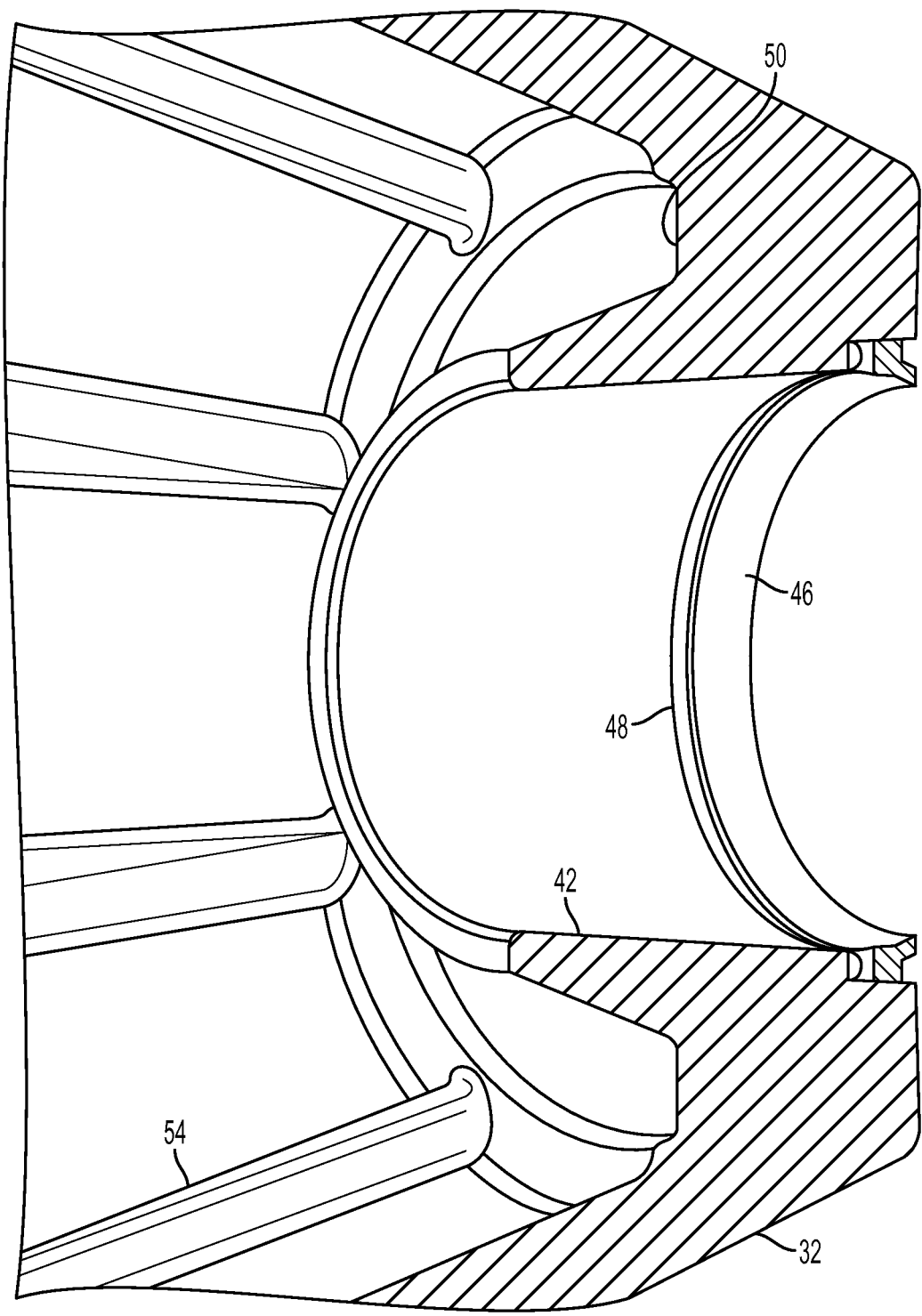
FIG. 3 is a close-up perspective view of a non-pressure head for a brake cylinder according to the present invention.

Non-pressure head 14 is generally conical and has a wall 32 that tapers from a first end 34 having a wider diameter corresponding to the diameter of pressure cylinder 12 to a second end 36 having a smaller diameter. First end 34 of non-pressure head 14 includes a radially extending flange 38 that corresponds to flange 28 of pressure cylinder 12. Second end 36 of pressure cylinder 12 includes an opening 40 that is formed through the apex of conical wall 32 and permits hollow rod 24 to extend out of brake cylinder 10 and be interconnected to the brakes of the rail vehicle. As seen in FIG. 2, opening 40 of non-pressure head 14 is defined by an annular bearing surface 42 that supports hollow rod 24 and allows hollow rod 24 to translate through the opening as hollow rod 24 is extended and retracted by piston 16. Non-pressure head 14 further includes a scraper 44 positioned exteriorly of opening 40 to engage hollow rod 24 as it translates into and out of opening 40, thereby excluding contaminants from non-pressure head 14. Alternatively, lip seal 46 and O-ring 48 may be positioned around opening 40 to further seal the interface between non-pressure head 16 and rod 24, as seen in FIG. 3. As non-pressure head 14 is preferably manufactured from a plastic composite material such as a high performance glass filled nylon. For example, Zytel HTN51G35 available from E. I. du Pont de Nemours and Company is an acceptable composite. Bearing surface 42, scraper 44, and lip seal 46 may all be integrally formed with the rest of non-pressure head 14.

As further seen in FIGS. 2 and 3, the interior of non-pressure head 14 includes a seat 50 formed integrally therein to support and properly locate brake piston return spring 26 about hollow rod 24. The interior surface 52 of non-pressure head 14 further includes a series of equidistantly positioned ribs 54 that extend along interior surface 52 of tapered wall 32 to provide structural support. In addition to providing structural stability, ribs 54 also act as a stop for piston 16 to prevent piston overtravel. Flange 38 of non-pressure head 14 includes a series of radial vent grooves 56 formed therein and spaced around the entire circumference of non-pressure head 14. As discussed above, ribs 54 and grooves 56 may be integrally formed into non-pressure head 14 when manufactured from a plastic composite.

Figure 4:
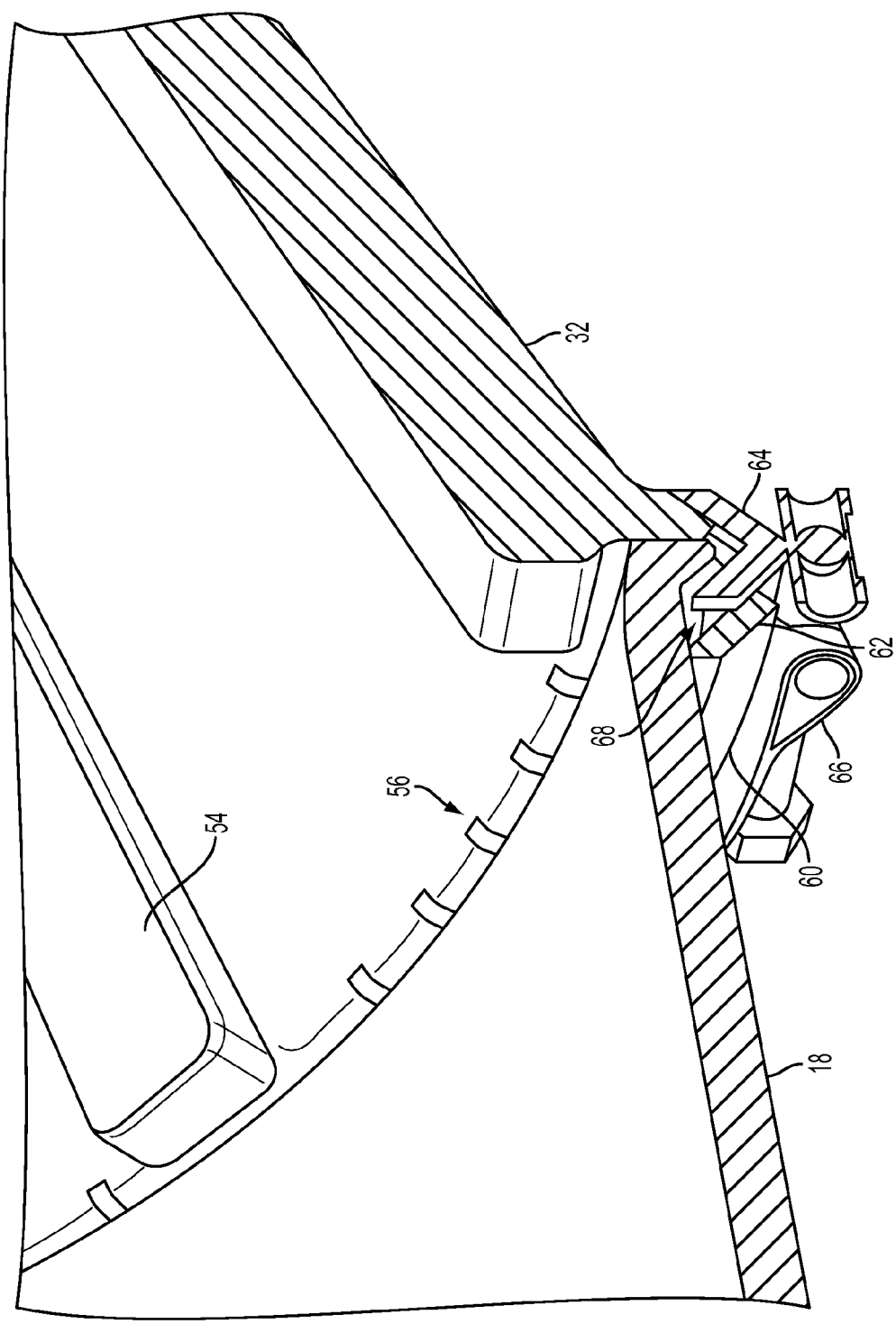
FIG. 4 is a partial cross-section of a non-pressure head for a brake cylinder according to the present invention.
Figure 5:
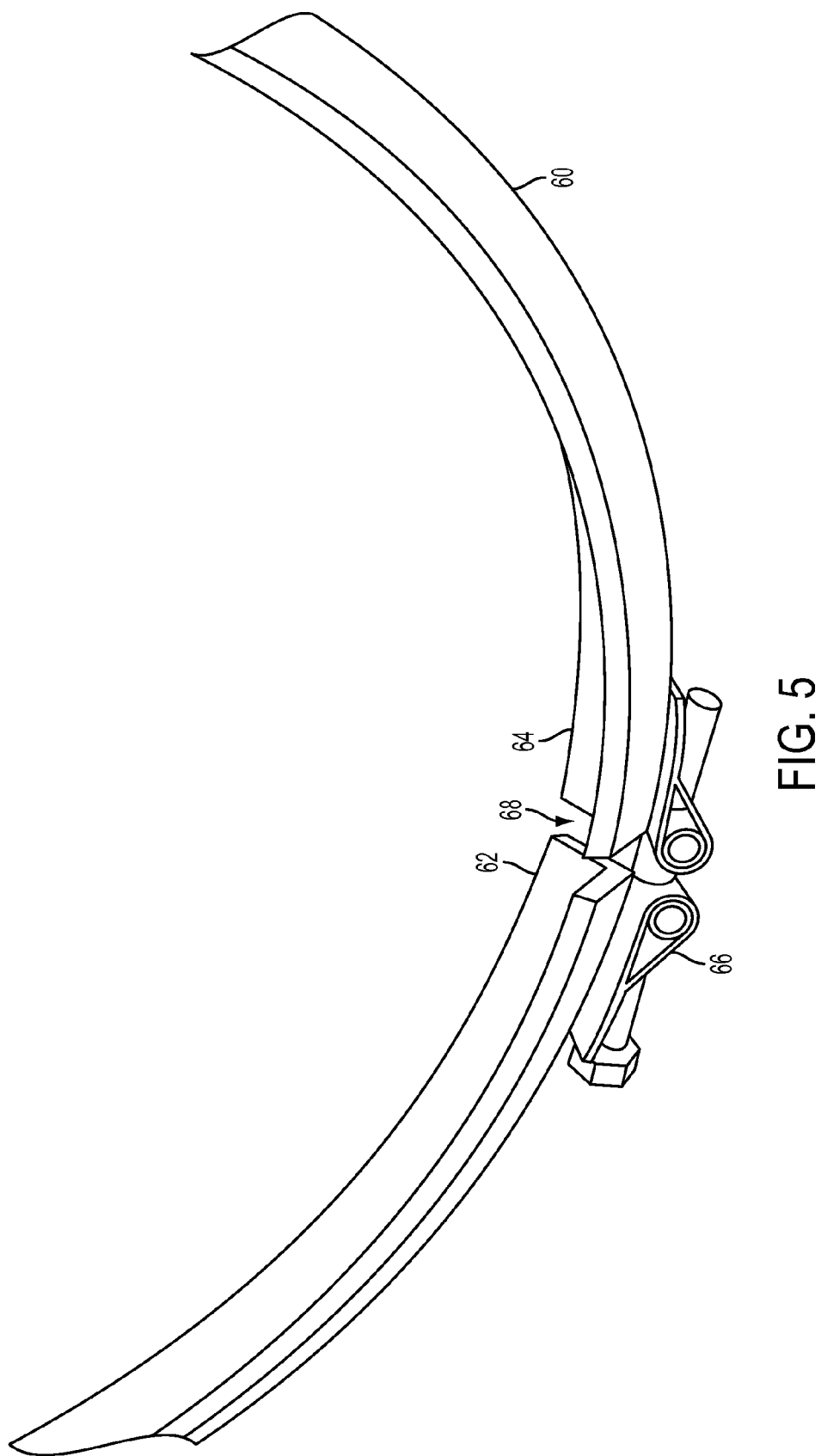
FIG. 5 is a perspective view of a V-shaped band for assembling a brake cylinder according to the present invention.

Referring to FIGS. 4 and 5, pressure cylinder 12 and non-pressure head 14 are coupled together by a band 60 that extends circumferentially around brake cylinder 10 and captures flanges 28 and 38. Band 60 is preferably V-shaped to encompass and cover flanges 28 and 38. The ends 62 and 64 of V-shaped band 60 may be clamped together by a single fastener 66 after V-band 60 is securely and tightly positioned over flanges 28 and 38 to secure non-pressure head 14 to pressure cylinder 12. A gap 68 is left between ends 28 and 38 to allow for drainage of any moisture that may accumulate inside brake cylinder 10. Gap 68 allows for pneumatic communication between the atmosphere and the interior of non-pressure head via radial vent grooves 56 formed in flange 38 of non-pressure head 14. Brake cylinder 10 may installed in any orientation while still maintaining downward venting because, prior to or after installation, V-shaped band can be loosened and repositioned so that gap 68 is at the bottom. Regardless of positioning, gap 68 will always align with one or more of the radial grooves 56 to provide for downward drainage of non-pressure head 14. V-shaped band 60 also avoids for the need for a gasket between flanges 28 and 38 as V-band 60 covers the intersection of flanges 28 and 38 and thus prevents the ingress of any contaminants.

Figure 6:
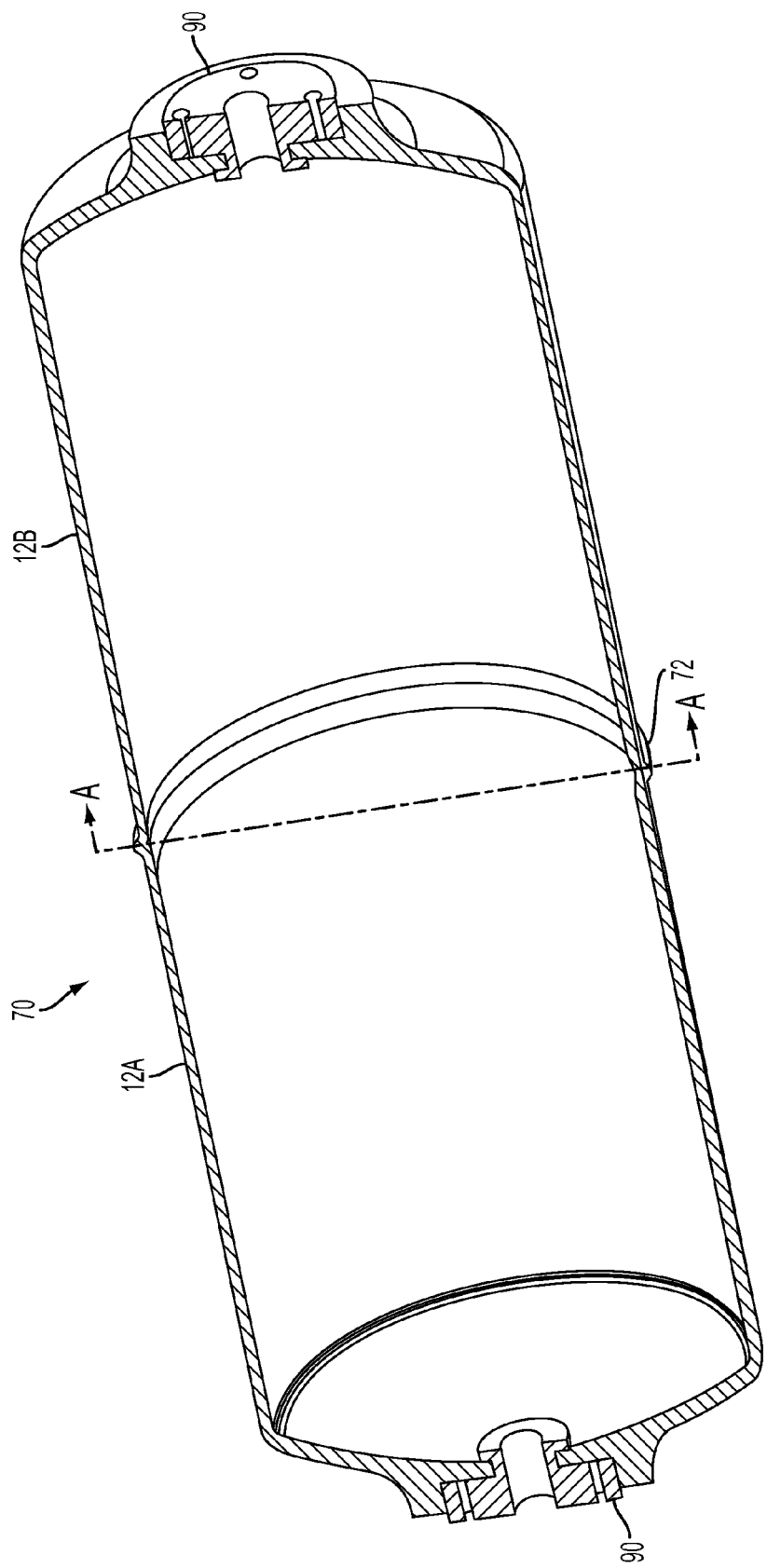
FIG. 6 is perspective view of two pressure cylinder halves for making a brake cylinder according to the present invention.

Brake cylinder 10 may be fabricated in several ways. For example, pressure cylinder 12 may be manufactured using a filament-wound composite, where a liner coat is applied to a mandrel and then high-strength synthetic fibers are wet wound with uncured epoxy around the mandrel until the desired thickness is attained. The filament may be a continuous glass fiber or other high strength fiber, providing that the filament provides the high tensile strength needed to withstand the internal pressure of a fully pressurized cylinder. When the wet epoxy cures, the composite glass fiber and cured epoxy make a pressure-tight cylinder with necessary mechanical properties to withstand high pressure. The initial liner coat may be chosen to provide a smooth surface with low friction for the piston seal. A mandrel with the desired geometry of the interior diameter and features of two pressure cylinder halves 70 positioned face-to-face may be used, as seen in FIG. 6. The geometry of the two halves 70 are then built up as described above. The manufacturing profile includes a rib 72 of machining stock at the face-to-face intersection of the two halves 70, shown as line A-A in FIG. 6. After pressure cylinder halves 70 cure, flanges 28 and 38 may be machined onto both pressure cylinder halves 70 by machining rib 72 to define both flanges 28 and 38. The two halves 70 may then be separated by a lathe cut at the intersection of the two halves 70 along line A-A making two pressure cylinders 12.

Figure 7:
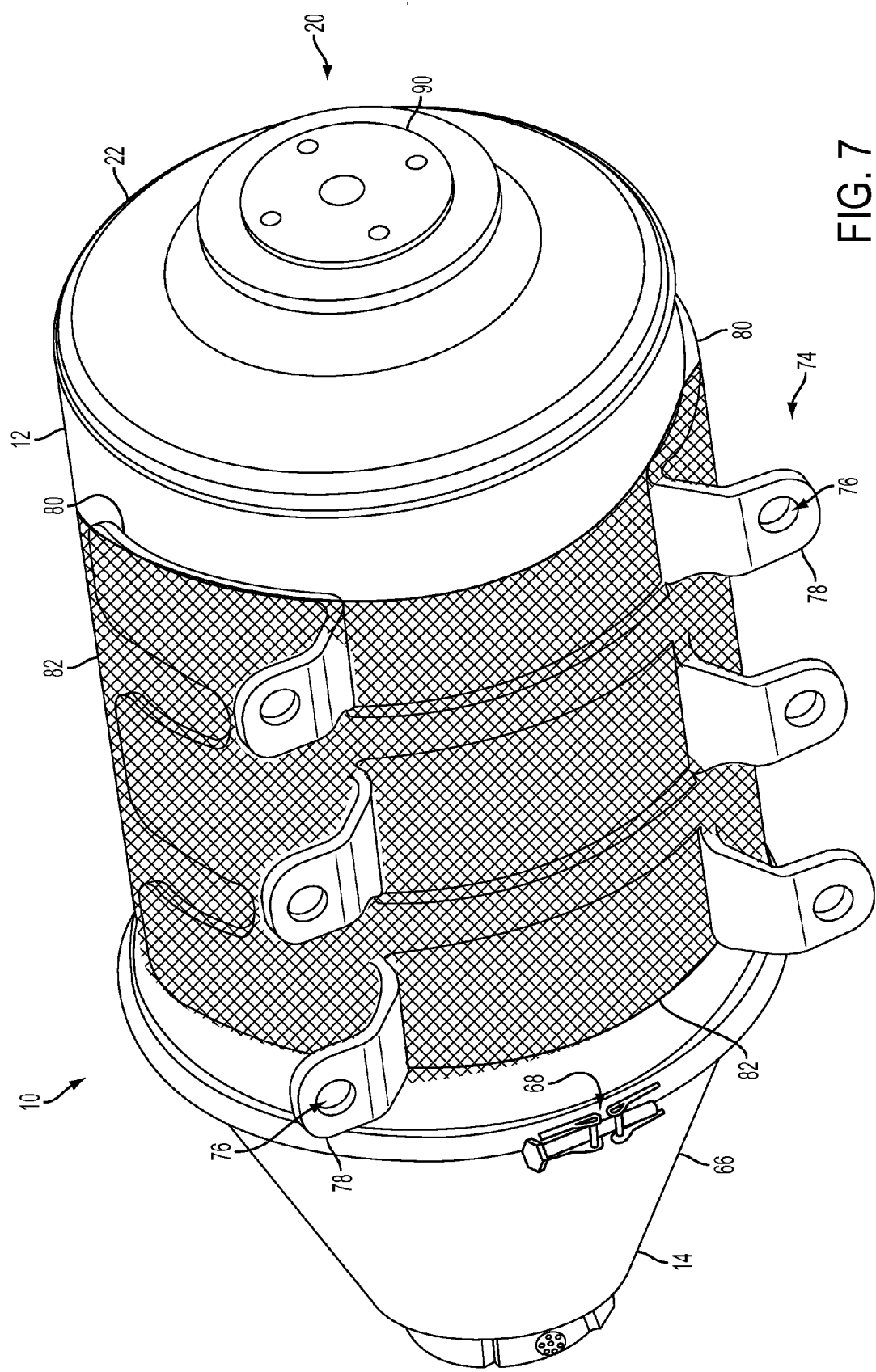
FIG. 7 is a perspective view of a brake cylinder according to the present invention.

Referring to FIG. 7, brake cylinder mounting feet 74 having industry standard mounting holes 76 and mounting surfaces 78 positioned on a series of ribs 80 that are curved along a radius matching the diameter of the pressure cylinder 12 body may be laid over the other diameter of pressure cylinder 12. Feet 74 may be made by steel stamping to define mounting holes 76, mounting surfaces 78, and ribs 80. Ribs 80 may then be over-wrapped with epoxy coated filaments 82 until ribs 80 are encapsulated with a sufficient thickness to provide a permanent structural connection between pressure cylinder 12 and ribs 80.

Figure 8:
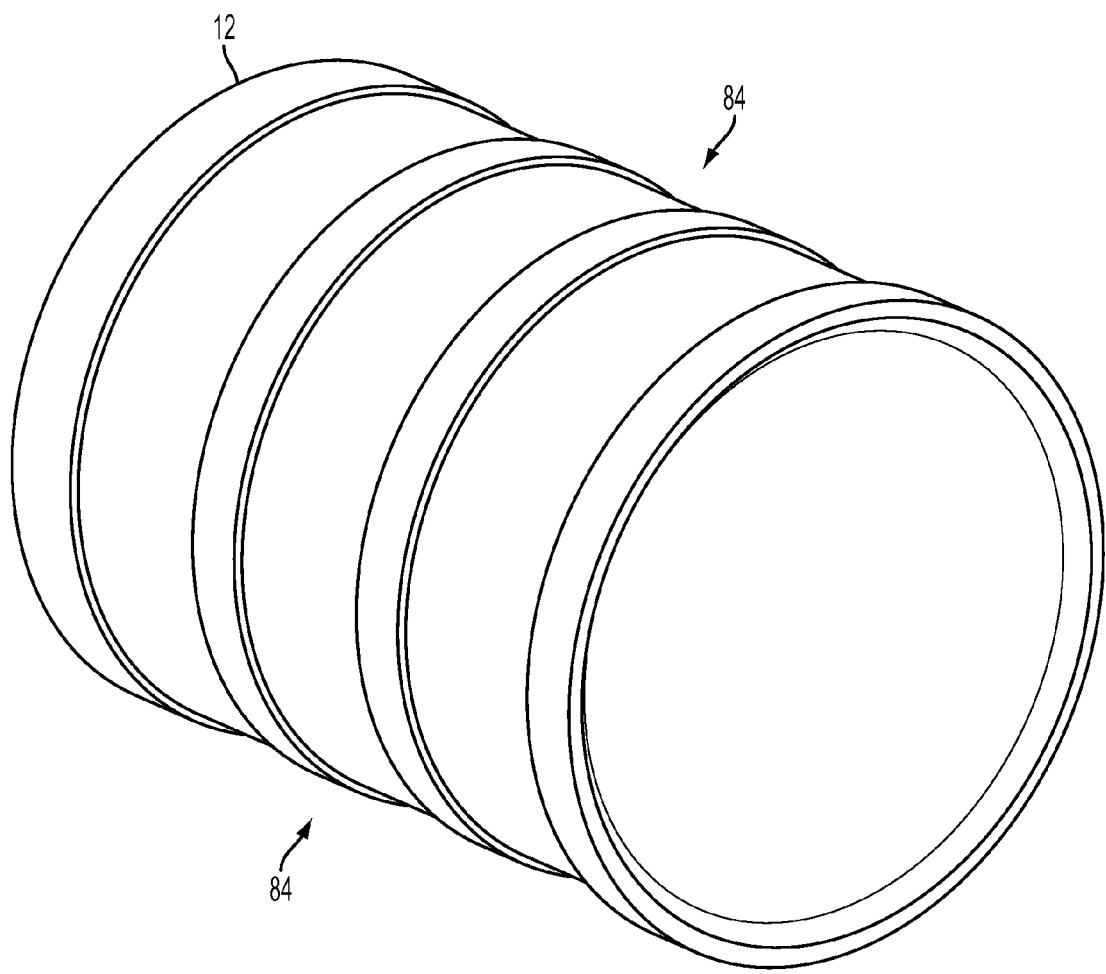
FIG. 8 is a perspective view of a pressure cylinder for a brake cylinder according to the present invention.
Figure 9:
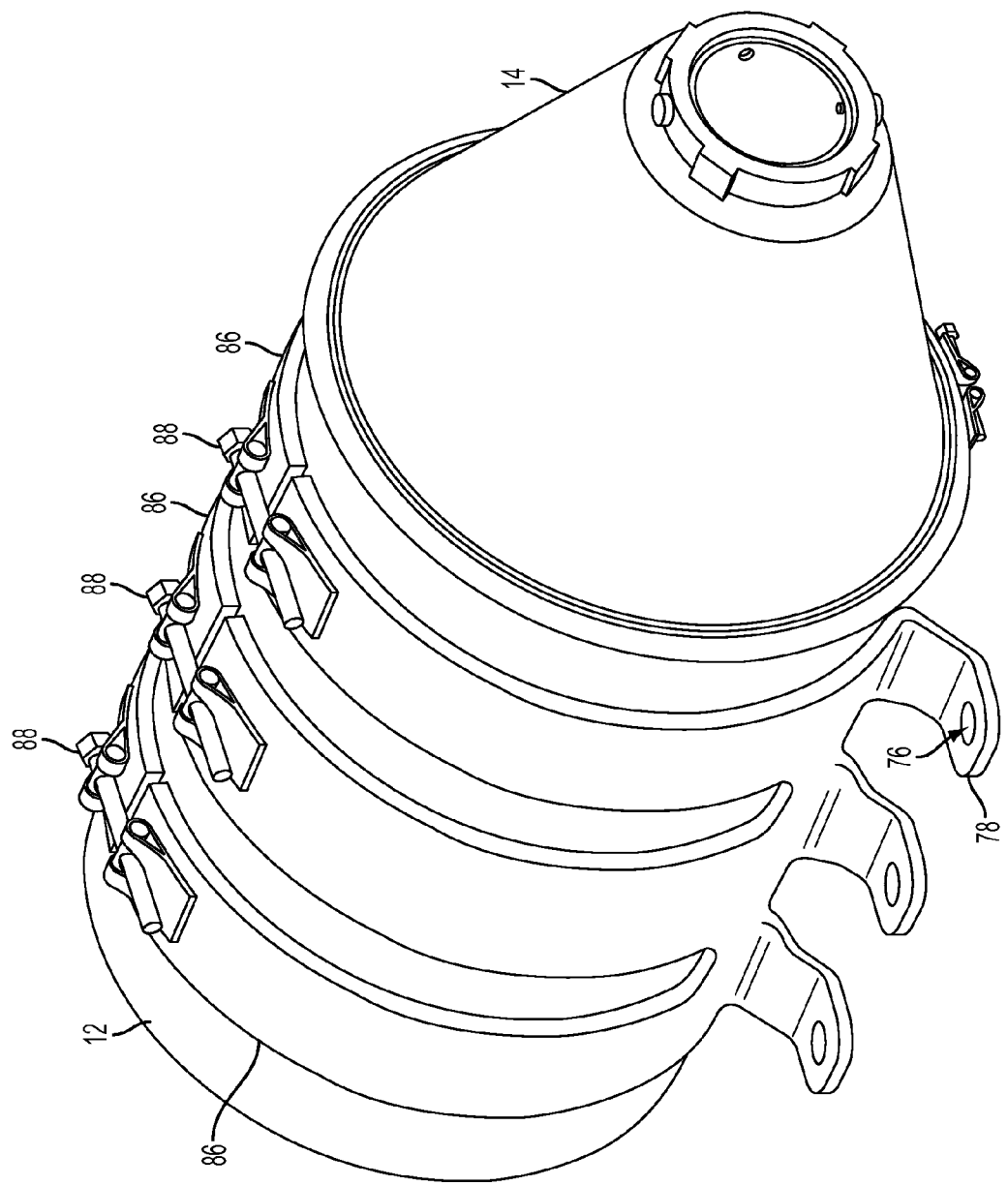
FIG. 9 is a perspective view of a brake cylinder according to the present invention.

Alternatively, as seen in FIGS. 8 and 9, ribs 80 may be fitted into grooves 84 that are either machined or molded into the outside diameter of the pressure cylinder 12 and then fastened to pressure cylinder 12 body with tensioning straps 86 positioned around the outside diameter of pressure cylinder 12 and tightened thereto by fasteners 88. Grooves 56 in the outer diameter of pressure cylinder 12 will transfer the significant longitudinal force between pressure cylinder 12 and mounting feet 74 when the brake cylinder is pressurized.

Figure 10:
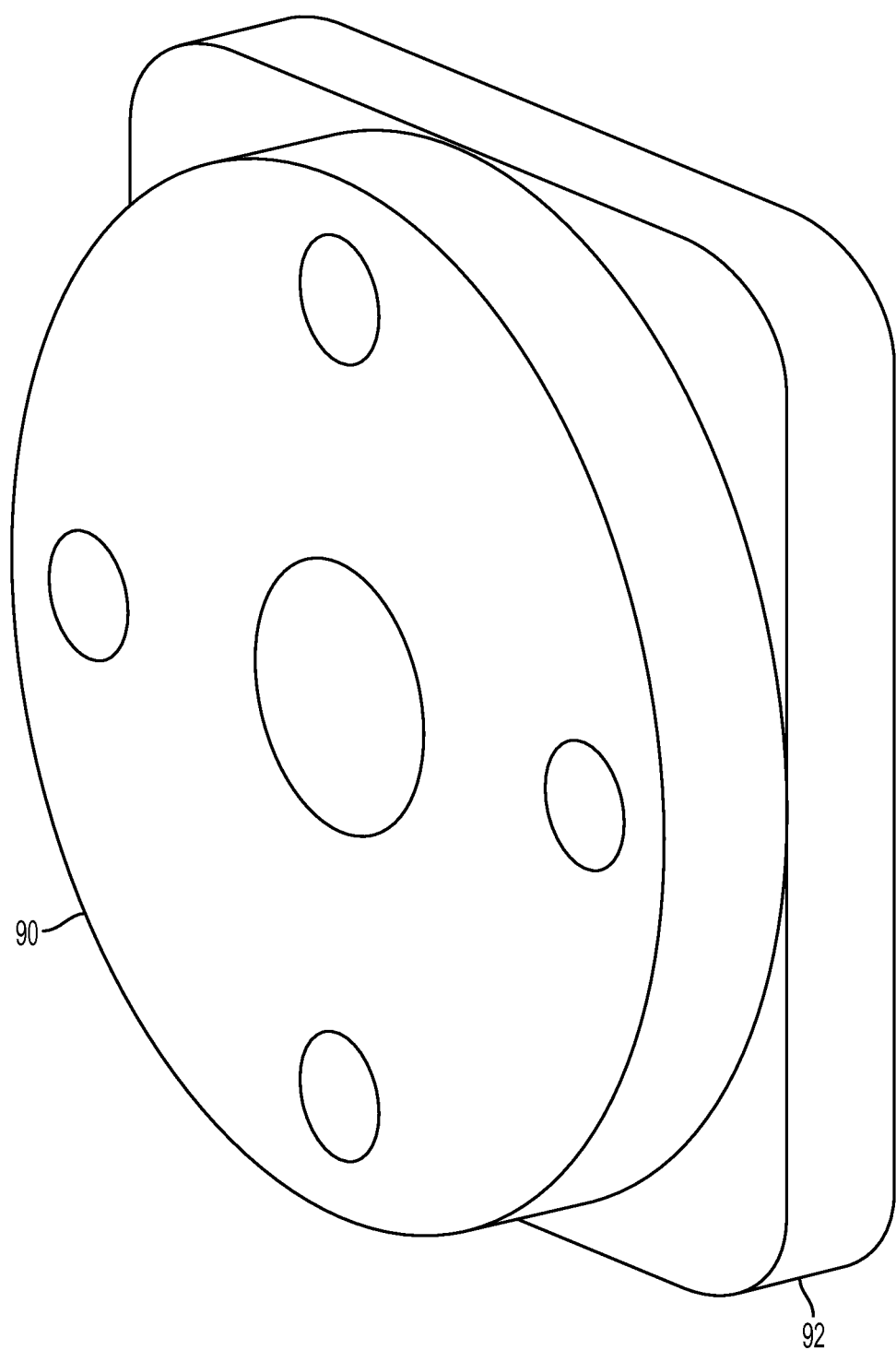
FIG. 10 is a perspective view of a pipe flange insert for a brake cylinder according to the present invention.
Figure 11:
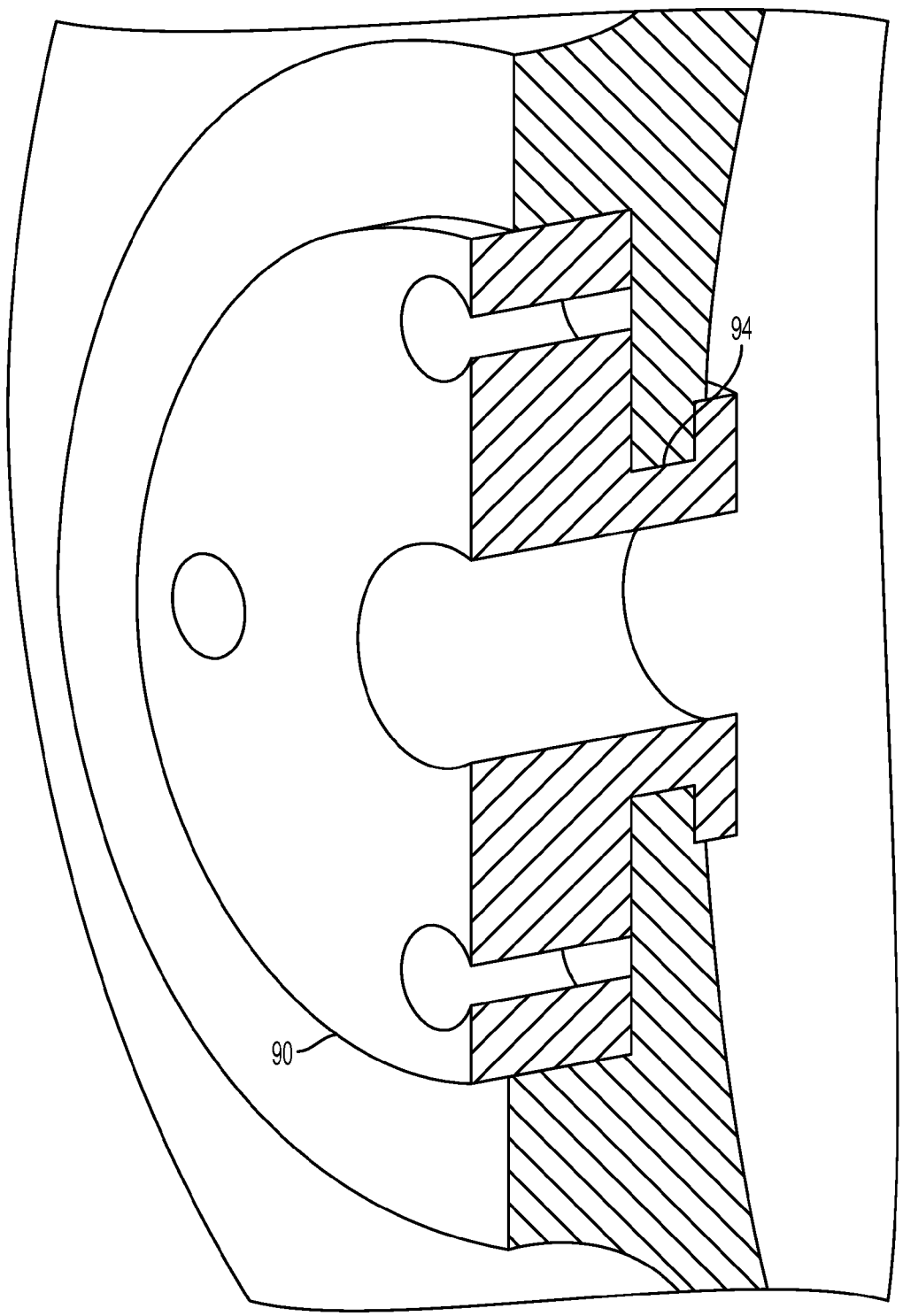
FIG. 11 is a partial cross-section of a pipe flange insert installed in a brake cylinder according to the present invention.

Referring to FIG. 10, inlet 20 of brake cylinder 10 may be formed with a pipe flange insert 90 that is integrated into pressure dome 22 of pressure cylinder 12 during the wet lay-up process described above. Pipe flange insert 90 is designed to match the bolt and air flow capacity of a standard railway ¾ inch flange, but other configurations are possible based on the particular standards of an installation. Insert 90 preferably includes a base 92 having a square outer geometry (or other angular geometry), so that once insert 90 is encapsulated in the epoxy-filament layup it will mechanically resist rotation and leaking. As seen in FIG. 11, insert 90 also includes a small diameter neck 94 that extends through pressure dome 22 to reduce the wetted circumference and minimize the possibility of any leakage of pressurized air from brake cylinder 10.

Figure 12:
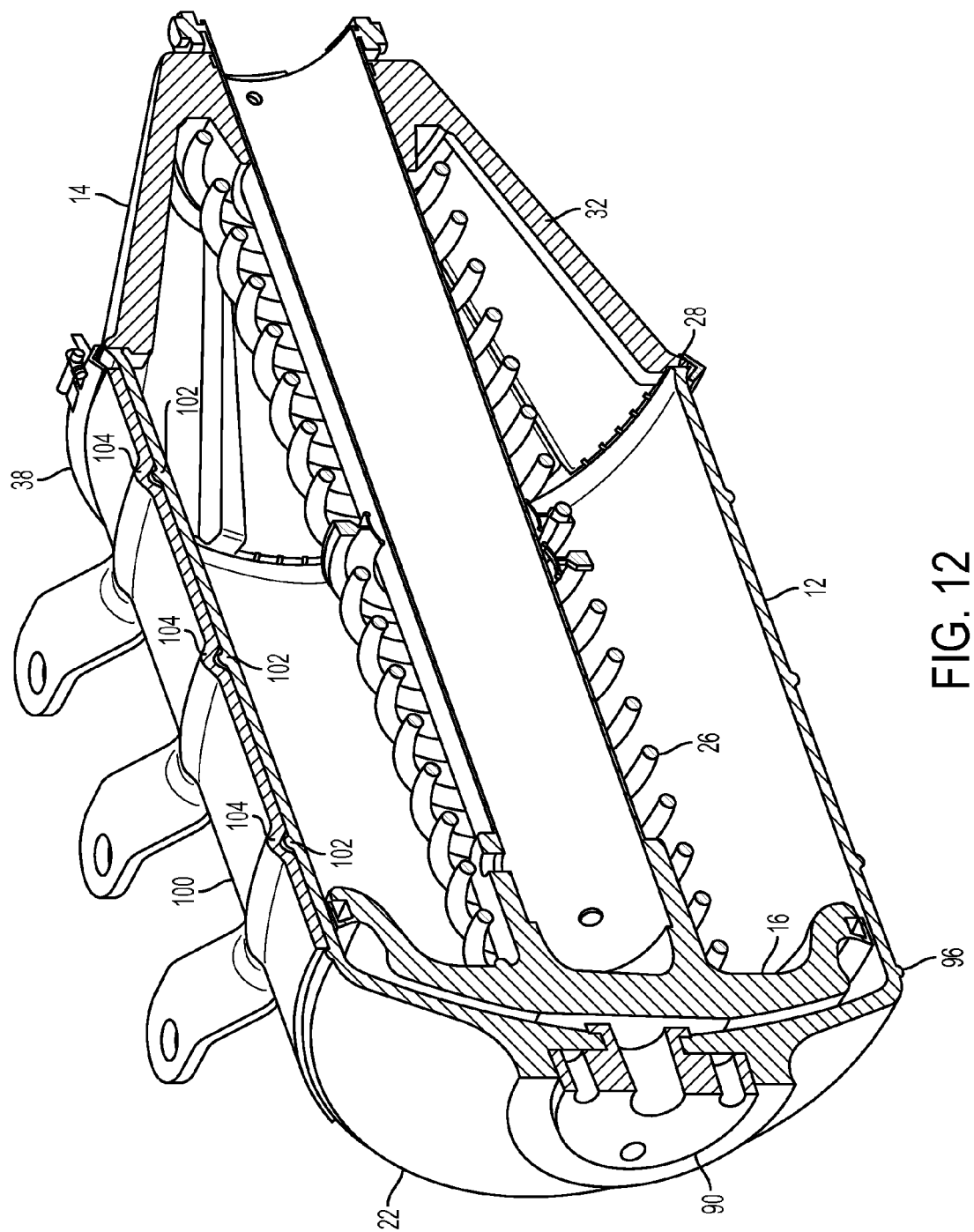
FIG. 12 is a cross-sectional view of a brake cylinder according to the present invention

Alternatively, as seen in FIG. 12, pressure cylinder 12 could be fabricated from steel or aluminum by welding a stamped pressure dome 22 onto tubing that is formed by drawing over a mandrel to have the desired size of pressure chamber 12. Pressure dome 22 includes a circumferential boss 96 at the weld seam with a diameter suitably larger than the OD of pressure cylinder 12. Flange 28 may then be welding onto or rolled into the other end of pressure cylinder 12 to provide a corresponding circumferential boss with a diameter suitably larger than the OD of pressure cylinder 12 for attaching non-pressure head 14. A mounting bracket 100 is fitted between circumferential boss 96 at pressure dome end of cylinder 12 and the circumferential boss provided by flange 28 at the non-pressure head end of pressure cylinder 12 and fastened with tension bands 86 as described above. This approach avoids welding in the working length of pressure cylinder 12 and, as a consequence, there is no need to machine finish the inside diameter of pressure cylinder 12 to remove welding artifacts. Alternatively, instead of welding a pressure dome 22 onto cylindrical tubing, pressure cylinder 12 could also be manufactured by spinning pressure cylinder 12 as a single piece, including flange 28 at non-pressure end and circumferential boss 96 at pressure dome end.

Regardless of fabrication technique, a mounting bracket 100 can still be attached using a series of diametrical bosses 102 spaced along pressure cylinder 12 and tensioning strap 86 as described above. For example, mounting bracket 100 may include a series of grooves 104 that correspond to and engage diametrical bosses 102 spaced along pressure cylinder 12, thereby providing a longitudinal stop which prevents mounting bracket 100 from slipping along pressure cylinder 12 when braking forces are developed. Mounting flange 102 may be attached to pressure cylinder 12 with an integral clamp or with a separate band clamp. During assembly, a bead of self-curing, gap-filling material may be applied to grooves 104 to fill any gap between grooves 104 and bosses 102 on pressure cylinder 12. Alternatively, pressure cylinder 12 and mounting flange 100 may be provided with a single corresponding boss 102 and groove 104 that are of sufficient size to carry the reaction loads from brake cylinder 10. In this embodiment, engagement bosses 102 may be made during the manufacture of the mandrel wound pressure cylinder 12 so that machining of the outer diameter of pressure cylinder 12 is not required.

What is claimed is:

1. A brake cylinder comprising:
a pressure cylinder having an opening and a first flange extending outwardly from the opening;
a non-pressure head having a second flange and positioned in abutment to the first flange of the pressure cylinder and including a plurality of radial grooves formed therein that are spaced around the entire second flange; and
a band extending securely around the first and second flanges and having first and second ends that define a gap in the band that is in alignment with at least one of the plurality of radial grooves in the second flange of the non-pressure head.

2. The brake cylinder of claim 1, wherein the non-pressure head further comprises an opening having a bearing surface for a piston rod.

3. The brake cylinder of claim 2, wherein the non-pressure head further comprises a seat for a piston return spring.

4. The brake cylinder of claim 3, wherein the non-pressure head further comprises a scraper for the piston rod.

5. The brake cylinder of claim 4, wherein an interior surface of the non-pressure head includes a series of ribs.

6. The brake cylinder of claim 5, further comprising a piston positioned in the pressure cylinder and a hollow rod coupled to the piston that extends from the piston through the opening of the non-pressure head to be in contact with the bearing surface and the scraper of the non-pressure head.

7. The brake cylinder of claim 6, wherein the piston return spring engages the piston of the pressure cylinder and the seat of the non-pressure head.

8. The brake cylinder of claim 1, further comprising a series of mounting feet attached to the pressure cylinder.

9. The brake cylinder of claim 8, wherein the mounting feet are attached by epoxy coated filaments to the pressure cylinder.

10. The brake cylinder of claim 8, wherein the mounting feet are positioned in a set of grooves formed in the outer surface of the pressure cylinder and fastened to the pressure cylinder by straps.

11. The brake cylinder of claim 8, wherein a set of grooves in the mounting feet are positioned over a corresponding set of diametrical bosses formed on the outer surface of the pressure cylinder.

12. The brake cylinder of claim 1, wherein the non-pressure head comprises plastic composite.

13. The brake cylinder of claim 1, wherein the pressure cylinder comprises filament wound composite.

* * * * *